United States Patent [19]

Le Gauyer

[11] Patent Number: 5,004,045
[45] Date of Patent: Apr. 2, 1991

[54] VEHICLE RADIATOR WITH CLAMPING FIXTURE TO REDUCE DEFORMATION DURING BRAZING AND METHOD OF MAKING

[75] Inventor: Philippe Le Gauyer, Paris, France
[73] Assignee: Valeo Thermique Moteur, Le Mesnil-St-Denis, France
[21] Appl. No.: 490,297
[22] Filed: Mar. 8, 1990
[30] Foreign Application Priority Data
Mar. 20, 1989 [FR] France .................. 89 03588
[51] Int. Cl.⁵ .................. F28D 1/00; B23K 31/00
[52] U.S. Cl. .................. 165/149; 165/79; 29/726; 228/44.3; 228/212
[58] Field of Search .................. 165/76, 79, 149, 906; 29/726; 228/44.3, 212

[56] References Cited
U.S. PATENT DOCUMENTS

| | | | |
|---|---|---|---|
| 2,443,574 | 6/1948 | Burns | 228/212 |
| 3,726,466 | 4/1973 | Vedder et al. | 228/49.3 |
| 3,769,675 | 11/1973 | Chartet | 29/726 |
| 3,894,580 | 7/1975 | Chartet | 165/67 |
| 3,939,908 | 2/1976 | Chartet | 165/149 |
| 3,941,293 | 3/1976 | Chartet | 228/44.3 |
| 4,128,235 | 12/1978 | Gersbacher | 29/726 |
| 4,700,469 | 10/1987 | Kroetsch et al. | 29/726 |
| 4,719,967 | 1/1988 | Scarselletta | 165/76 |

FOREIGN PATENT DOCUMENTS

| | | | |
|---|---|---|---|
| 1185042 | 1/1965 | Fed. Rep. of Germany | 228/212 |
| 2094566 | 2/1972 | France . | |
| 46996 | 4/1981 | Japan . | |
| 126693 | 5/1988 | Japan | 228/212 |
| 625890 | 9/1978 | U.S.S.R. | 228/212 |
| 1350154 | 4/1974 | United Kingdom . | |
| 2120769 | 12/1983 | United Kingdom | 165/149 |

*Primary Examiner*—John Rivell
*Assistant Examiner*—L. R. Leo
*Attorney, Agent, or Firm*—Dennison, Meserole, Pollack & Scheiner

[57] ABSTRACT

The present invention relates to a method of manufacturing a heat exchanger comprising a bundle which consists of a plurality of tubes, a plurality of fins alternating with the tubes, at least one terminal end beam extending parallel to the tubes, and at least one collector plate at the end of the bundle. Clamping means are arranged in the vicinity of the collector plate, and in line with deformable means which are provided on projecting portions of the end beam or end beams.

The invention is especially applicable to a heat exchanger for use in automotive vehicles.

9 Claims, 1 Drawing Sheet

VEHICLE RADIATOR WITH CLAMPING FIXTURE TO REDUCE DEFORMATION DURING BRAZING AND METHOD OF MAKING

FIELD OF THE INVENTION

The present invention relates to a method of manufacturing a heat exchanger in which the components are assembled together by welding, and to a heat exchanger made by such a method.

BACKGROUND OF THE INVENTION

In current practice, it is usual to manufacture a welded heat exchanger, in particular where the welding operation consists in brazing, by forming a bundle of tubes and fins between two collector plates, and then joining the various components to each other by the welding operation. To this end, the collector plates are intersected by a succession of said tubes, between which there are disposed, parallel to the tubes, corrugated fins. In this way a stack of tubes and fins is built up.

On the sub assembly formed in this way, a pair of end beams, extending generally parallel to the tubes and fins, are mounted respectively at the beginning and the end of the stack. The various components of this assembly are then wholly or partly covered with welding material, for example brazing metal, which joins all components together and also ensures proper sealing at the junction between the tubes and the collector plates.

Before the welding operation takes place, it has been found that the junction between the tubes and the collector plates tends to give the stack a so-called "barrel-like" shape. This is because, whereas in the region of the collector plates the dimensions of the stack are constrained so as to be substantially the same as the final dimensions of the stack, in the central part of the stack the dimensions are larger, since the various components to be assembled together are covered with welding material and there is nothing to constrain this central part from being able to expand. Thus during the brazing operation, melting of the brazing metal does not allow the stack to assume a conventional shape: on the contrary, it preserves the barrel-like shape of the stack.

It has been proposed that, during the brazing operation, the various components of the stack be clamped together using clamping means having a lower degree of thermal expansion than that of the metal of which the stack is made, in such way as to constrain the cross section of the stack after brazing to a desired value which is substantially the same as that adopted in the region of the collector plate.

However, that proposal has the disadvantage that it cannot conveniently be applied in relation to the shape of the stack. Indeed, it is necessary to provide clamping devices which differ from each other according to their positions on the stack. This can only complicate the assembly of the heat exchanger, and tends to preclude the use of identical clamping means which, because of the barrel-like shape of the stack, will produce either excessive clamping in the middle part of the stack or an insufficient degree of clamping in the region of the collector plates.

SUMMARY OF THE INVENTION

An object of the present invention is to overcome these disadvantages, and to provide a method of manufacture in which the clamping means are all identical with each other and allow the barrel-like shape of the stack to be converted into a substantially rectangular shape.

To this end, the method of manufacture of a heat exchanger in which the components are secured together by welding, and in particular by brazing, where the heat exchanger comprises a bundle of tubes with fins, at least one terminal end beam and at least one collector plate, is characterised in that, before the welding operation, clamping means are disposed in the vicinity of the collector plate and in line with deformable means which are provided on projecting portions of the end beam or end beams. In this way, due to the deformable means the clamping means are able to act without excessive force in the region of the collector plates.

In accordance with another feature of the invention, the method is characterised in that, prior to the welding operation, further clamping means are disposed in the region of the central part of the bundle, in engagement with compensating means which are provided on projecting portions of the end beam or end beams. Such compensating means result in the barrel-like shape of the bundle not having any influence on the length of the clamping means, so that identical clamping means can now be mounted at any position along the whole length of the bundle.

According to a further feature of the invention, the method is characterised in that, subsequent to the welding operation, the deformable means lose their initial shape, the clamping means being removed. At the end of the process, the deformable means have played their part in absorbing all of the deformations which should initially have occurred in the region of the tube bundle, and the removal of the clamping means can easily be carried out.

Further features and advantages of the invention will become evident from the description which follows, given by way of example only and with reference to the accompanying drawings.

DESCRIPTION OF THE PREFERRED EMBODIMENTS OF THE INVENTION

Figure 1:
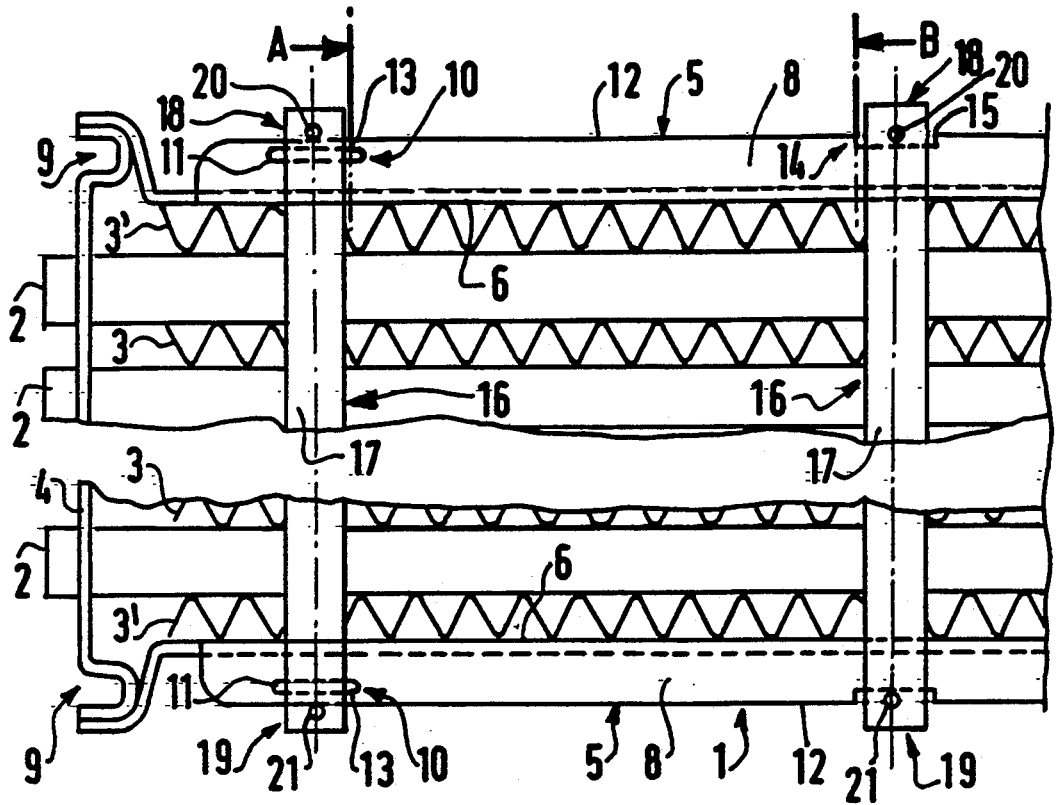
FIG. 1 is a partial view of a heat exchanger according to the invention, including clamping means for use during the welding operation.

In FIG. 1, the heat exchanger in accordance with the invention comprises a bundle 1 of tubes 2 having fins 3, 3', together with at least one collector plate 4 which is arranged to be intersected by the free ends of the tubes 2, and to be covered by a fluid collecting box (not shown), and at least one end beam 5. In this example, the end beams 5 are generally U-shaped cross section.

The tube bundle 1 includes a stack of tubes 2 alternating with corrugated fins 3, 3' which are arranged parallel to the tubes. The stack starts and finishes with the fins 3', which are overlaid by the respective end beams 5. The outer face of the base 6 of the U-shaped cross section of each end beam 5 bears on the terminal fin 3' and on the peripheral edge 9 of the collector plate 4. The side elements 7 and 8 of each end beam 5, constituting projecting portions of the latter, extend away from the bundle 1.

Figure 2:
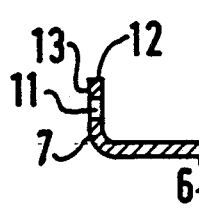
FIG. 2 is a view in partial cross section taken on a line A, showing an end beam that forms part of the heat exchanger of FIG. 1.

In addition, with reference to FIG. 2 each end beam 5 is provided with a deformable means 10 in the vicinity of the collector plate 4. This deformable means 10 comprises an opening 11, which in this example is in the form of an oblong slot. This slot 11 is located on each side element 7, 8 and extends parallel to the base 6 at a distance from the free edge 12 of the side elements. The slot 11 thus defines a metal tongue 13 which is able to collapse into the free space defined in the opening 11.

Each beam 5 also includes a compensating means 14 in a central region of the tube bundle. The compensating means 14 comprises, in this example, a slot 15 of rectangular shape, which is formed on the side elements 7 and 8 and which is open at the free edge 12 of the latter. The slot 15 extends parallel to the base 6. The purpose of this compensating means will be explained latter on in this description.

Figure 5:
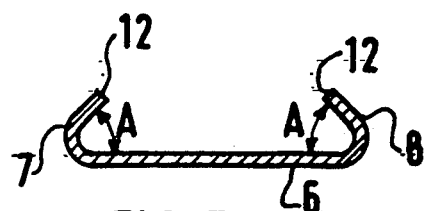
FIG. 5 is a view in partial cross section showing a modification to what is shown in FIG. 2.

FIG. 5 shows a modification in the deformable means 10, in which all or part of each side element 7, 8 is bent inwardly towards the interior of the U of the beam 5, so as to form an angle A with the base 6. The angle A is not 90 degrees, and in this example it is less than 90 degrees.

This bending operation may of course be applied to the side elements 7 and 8 over their whole length, or alternatively over only a portion of the latter, extending longitudinally and situated, as described above, in the vicinity of the collector plate 4. Also, without departing from the essence of the present invention, the deformable means 10 and the compensating means 14 could be situated on projecting portions comprising lugs extending from a flat plate constituting the base of the end beam.

The assembly consisting of the tubes 2, fins 3 and 3', end beams 5 and collector plates 4 is arranged to undergo a welding type operation. In this example this operation consits of a brazing operation which is carried out by passing the assembly through an oven, thus allowing the various members to be assembled together. To this end, before the brazing operation takes place, a plurality of clamping means 16 are applied to the tube bundle 1 at right angles to the longitudinal direction which the tubes 2 extend. The clamping means 16 are all of the same length and have the same longitudinal thermal expansion characteristics, and bear on the end beams 5 while being arranged on either side of the tube bundle 1.

In order to fit the clamping means to the tube bundle, the latter is first put under compression by the exertion on the end beams 5 of a force transverse to the tubes 2. This force tends to reduce the "barrel-like" shape of the tube bundle. The clamping means 16 are now positioned at regular intervals along the whole length of the tube bundle. Those clamping means which are placed close to the collector plates 4 will act in line with the deformable means 10, while the remaining clamping means are positioned substantially in the middle part of the tube bundle, each at the same location as a respective one of the compensating means 14.

After the initial transverse force, mentioned above, exerted on the end beams 5 has been released, the clamping means 16 apply a clamping force in line with their points of contact with the tube bundle, this clamping force being substantially equal to the initial force exerted on the end beams. The assembly is now ready to pass through the brazing oven.

In practice, the clamping means 16 take the form of stretcher bars 17, each end 18 or 19 of which carries a bearing element which in this example consists of a cylindrical bar 20, 21 that bears on the end beams 5. As is best seen in FIG. 1, the cylindrical bars 20 and 21 of the stretcher bars 17 closest to the collector plate 4 bear on the free edges 12 of the end beams 5, more particularly in line with the opening 11 and substantially in the middle of the length of the latter. The cylindrical bars 20 and 21 of the stretcher bars 17 that are situated in the middle part of the tube bundle bear on the base of the slots 15, in such a way that all of the bars 20 and all of the bars 21 lie in a common plane perpendicular to the collector plate 4.

During the brazing operation, the stretcher bars 17 undergo the same thermal expansion and contraction as each other, while the stack of tubes 2, fins 3, 3' and end beams 5 undergo a different pattern of thermal expansion and contraction from that of the stretcher bars. Because of the differential thermal movement resulting from this, the cylindrical bars 20 are brought closer to the bars 21, thus clamping the tube bundle 1.

Figure 3:
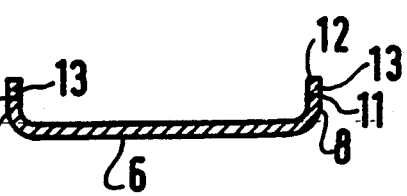
FIG. 3 is a view in partial cross section corresponding to that of FIG. 2, and in which is shown in the final state of the end beam.
Figure 4:
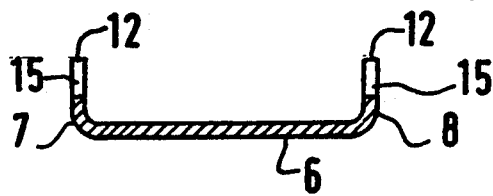
FIG. 4 is a view in partial cross section taken on the line B in FIG. 1, showing an end beam that forms part of the heat exchanger in FIG. 1.

The operation will now be described in more detail, step by step. In the first stage of the operation, the stretcher bar 17 closest to the collector plate 4 does not compress the tube bundle, but merely bends the metal tongues 13 which lie over the openings 11, until the latter become closed up in line with the contact points 20 and 21 by contact of the upper edge of each opening 11 with its lower edge (FIG. 3). At the same time, the cylindrical bars 20 and 21 of the stretcher bars 17 located in the central part of the tube bundle compress the latter and reduce its barrel-like shape.

Figure 6:
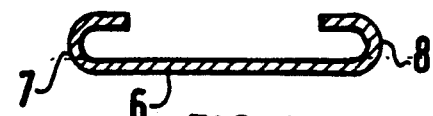
FIG. 6 is a view in partial cross section corresponding to that of FIG. 5, showing the final state of the end beam.

Following that stage, the points of contact of the stretcher bars 17 lie in a common plane, and the tube bundle has then partially or fully abandoned its barrel-like shape. The brazing operation is then able to continue until completed, after which the stretcher bars 17 are removed from the tube bundle.

Where the modified form of end beam shown in FIG. 5 is used, the cylindrical bars 20 and 21 of the stretcher bars 17 arranged closest to the collector plates 4 bear on the free edge 12 of the bent over portions of the side elements 7 and 8, while as already described above, the points of contact of the cylindrical bars 20 and 21 of the stretcher bars in the middle of the tube bundle 1 rest in the slots 15. This being so, in the first stage of the brazing process, due to the differential thermal expansion and contraction behavior between, firstly the stack of tubes 2, fins 3 and 3' and end beams 5, and secondly the stretcher bars 17, the latter exert a force on the bent over portions of the side elements 7 and 8. The effect of this is to bend the latter over to an increased extent so as to reduce the angle A. The resulting configuration of the end beams 5 is as shown in FIG. 6, in which the side elements 7 and 8 are now parallel to the base 6 of the end beam 5, but are spaced from the base.

The stretcher bar or bars 17 in the middle part of the tube bundle 1 act in the same way as has already been described, and the rest of the brazing process is identical to that already described.

The invention is not limited to the embodiments described, but embraces all modifications thereof. For example, the deformable means may comprises an opening of any shape and disposition whatever; and the compensating means 14 could be omitted by reducing the height of the side elements 7 and 8 while preserving the width of the metal tongues 13.

Similarly, it may be arranged that the projecting portions 7 and 8 of the end beams 5 be provided with deformable means 10 associated with the compensating means 14, in the case in which it is desired to provide stretcher bars 17 between those stretcher bars that are arranged in the vicinity of the collector plate 4 and those which are associated with the middle part of the tube bundle 1.

What is claimed is:

1. A method of manufacturing a heat exchanger comprising a bundle including a plurality of tubes, a plurality of fins alternating with said tubes, at least one end beam terminating said bundle and extending along it, and at least one collector plate closing an end of the bundle, said at least one end beam comprising outwardly projecting portions thereof, the method including the steps of:

providing deformable means on said projecting portions of said at least one end beam;

disposing a clamping means in the vicinity of said at least one collector plate and in line with said deformable means;

and securing the components of the bundle together by welding.

2. A method according to claim 1, wherein the method further comprises, prior to the welding step, the steps of:

providing compensating means on said projecting portions of said at least one, end beam in a middle part of the latter;

and providing further clamping means on said compensating means in the region of a middle part of the bundle.

3. A method according to claim 1 or claim 2, including the further step, following the weldding step, of removing the clamping means, the deformable means having lost their initial shape.

4. A heat exchanger comprising a bundle including a plurality of tubes, a plurality of fins disposed alternately with said tubes, at least one end beam terminating the bundle and extending longitudinally thereof, and at least one collector plate closing the end of the bundle, said at least one end beam having a base portion, portions projecting outwardly therefrom, and deformable means on said projecting portions in the vicinity of said at least one collector plate, the components of said bundle being secured together by welding; and said deformable means comprising an opening formed in said projecting portions so as to define a deformable metal tongue.

5. A heat exchanger comprising a bundle including a plurality of tubes, a plurality of fins disposed alternately with said tubes, at least one end beam terminating the bundle and extending longitudinally thereof, and at least one collector plate closing the end of the bundle, said at least one end beam having a base portion, portions projecting outwardly therefrom, and deformable means on said projecting portions in the vicinity of said at least one collector plate, the components of said bundle being secured together by welding; and wherein said deformable means comprises a bent over portion of said projecting portions defining an angle with the base portion of the corresponding end beam.

6. A heat exchanger according to claim 4, further including compensating means comprising a slot formed in said projecting portions.

7. A heat exchanger according to claim 5, further including compensating means comprising a slot formed in said projecting portions.

8. A heat exchanger according to any one of claims 4 to 7, wherein said projecting portions comprise upstanding side elements, the beam being of U-shaped cross section.

9. A heat exchanger according to any one of claim 4 to 7, wherein said projection portions comprise lugs extending from the base portion of the beam.

* * * * *